Figure 1:
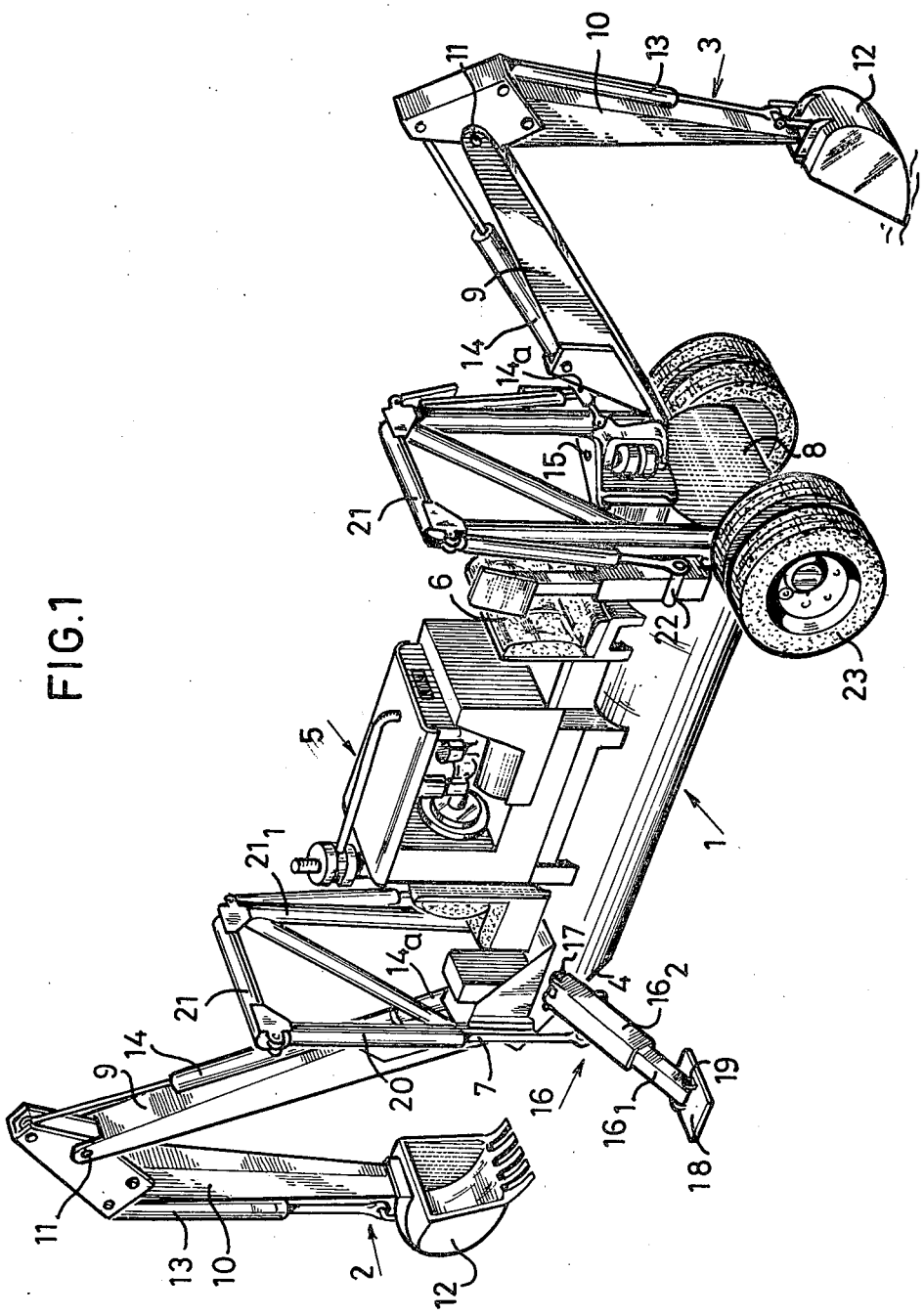

United States Patent [19]

Bibaut

[11] 4,310,975
[45] Jan. 19, 1982

[54] DREDGING OR EXCAVATING MACHINE FOR MARSHES OR CANALS

[76] Inventor: Gilbert Bibaut, 22 rue de Compiegne, 60880 Le Meux, France

[21] Appl. No.: 138,346

[22] Filed: Apr. 8, 1980

[30] Foreign Application Priority Data

Apr. 10, 1979 [FR] France ............................... 79 08994

[51] Int. Cl.³ .............................................. E02F 9/00
[52] U.S. Cl. ......................................... 37/71; 37/54; 414/694; 414/718
[58] Field of Search ................. 37/71, 73, 54, DIG. 6, 37/103; 414/694, 695, 718, 728

[56] References Cited

U.S. PATENT DOCUMENTS

| | | | |
|---|---|---|---|
| 2,897,986 | 8/1959 | Davis | 414/695 X |
| 3,064,370 | 11/1962 | La Fleur | 37/71 |
| 3,298,547 | 1/1967 | Williams | 37/103 X |
| 3,425,572 | 2/1969 | Brach | 414/718 X |
| 3,635,364 | 1/1972 | Tingleff | 414/694 |
| 3,777,919 | 12/1973 | Konijn | 37/73 X |
| 3,792,539 | 2/1974 | Clark | 37/103 X |
| 3,855,807 | 12/1974 | Grable | 37/71 X |
| 3,987,563 | 10/1976 | Baur | 37/DIG. 6 |
| 4,049,070 | 9/1977 | Soyland | 37/103 X |
| 4,070,978 | 1/1978 | Virgilio | 37/71 X |

FOREIGN PATENT DOCUMENTS

| | | | |
|---|---|---|---|
| 2133365 | 1/1973 | Fed. Rep. of Germany | 37/71 |
| 2411115 | 9/1974 | Fed. Rep. of Germany | 37/71 |

*Primary Examiner*—Clifford D. Crowder
*Attorney, Agent, or Firm*—Fidelman, Wolffe & Waldron

[57] ABSTRACT

A machine for cleaning out or dredging out ponds, marshes, or canals, comprises a central longitudinally extending fluid-tight cylindrical body having a low coefficient of friction with the ground and provided with withdrawable stabilizing feet. The base of the body is beveled at both ends. An excavating shovel, having two articulated arms actuated by cylinder devices, is mounted on each end of the body and pivotal through at least 180° about a vertical axis from one lateral side of the body to the other under the control of another cylinder device. The two shovels act as excavating devices or as devices for axially displacing the machine over the ground or laterally displacing the machine over the ground in combination with the stabilizing feet.

15 Claims, 12 Drawing Figures

DREDGING OR EXCAVATING MACHINE FOR MARSHES OR CANALS

The invention relates to a public works machine to travel on marshlands, ponds, canals or beds of brooks so as to effect the dredging and the cleaning out thereof.

Many earth working machines are already known which are adapted for this type of work. However, a distinction must be made between machines on articulated tracks and floating machines usely termed dredges.

The articulated track machines are usually tractor vehicles provided with excavating shovels formed by a bucket carried at the end of a system of two arms articulated on a common pin and actuated by cylinder devices, the two arms being capable of being closed or spread apart in the manner of a compass. These engines are mostly used on dry ground for earth-working, loading, excavation or forming trenches, but cannot be employed in marshlands for the understandable reason that they sink into the ground, and consequently cannot be employed for cleaning out ponds or marshes.

Dredges, whether it concerns bucket-dredges, dredges having a pressing bucket, or suction or vacuum dredges, are formed by a kind of floating pontoon or a flat-bottom boat provided with a bucket-chain or an articulated bucket mounted on a rotary crane or a suction mechanism.

These dredges are employed only on stretches of water, since they must of course float. Consequently, they are not suitable for work on marshy or slimy ground (where there is little water). Consequently, no vehicle exists which is capable of indifferently travelling on roads (for transport) and on marshy working areas, since the known machines indeed require either a dry ground or a stretch of water.

The object of the invention therefore is to overcome this drawback and relates for this purpose to a machine which has the feature of being capable of easily moving on slimy beds without sinking in, the cleaning out means serving not only for the dredging operations but being also employed as means of locomotion, said machine being moreover designed to be easily converted into an amphibian vehicle so as to float if required.

The invention therefore relates to a machine in particular for cleaning out or dredging ponds, marshes or canals, of the type comprising a supporting structure provided with stabilizing feet and equipped with a scraping and cleaning out means which are movable relative to the structure about two vertical and horizontal axes, these means being driven and controlled from an operator's station located on the supporting structure, this machine being characterized in that said supporting structure is constituted by fluidtight body which has a cylindrical or like shape at least one of the ends of which comprises a section which is beveled at the base, this body acting as a support frame for means for driving and controlling an excavating shovel located at at least one of the two ends of the supporting structure, this shovel being carried in the known manner by two articulated arms actuated by cylinder devices.

According to a preferred embodiment, the supporting structure in the shape of a cylinder is provided at each of its two ends with a excavating shovel whose arm which is connected to the structure is pivotable on a vertical axis through an angle of at least 180°.

According to a feature of the invention, the supporting structure is provided at at least one of its ends with a pair of removable wheels employed for transport on the road, the excavating shovel located adjacent these wheels serving as a jack for upwardly inclining the machine and allowing the dismounting and withdrawal of the wheels.

A machine according to the invention is shown by way of a non-limitative example in the accompanying Figures in which:

FIG. 1 is a perspective view of the machine according to the invention.

Figure 2:
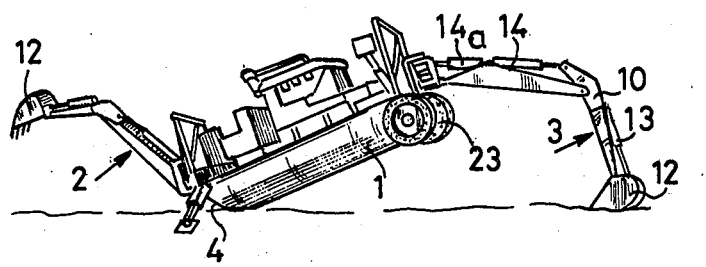
Figure 3:
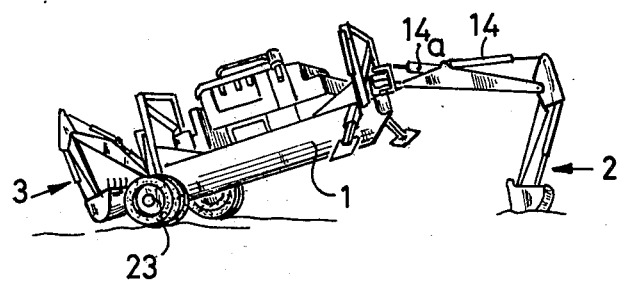
Figure 4:
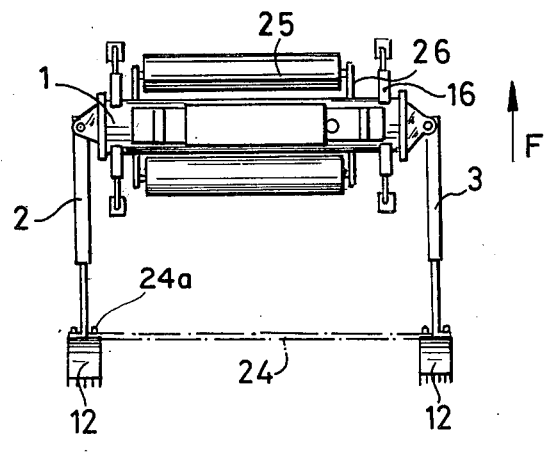
Figure 5:
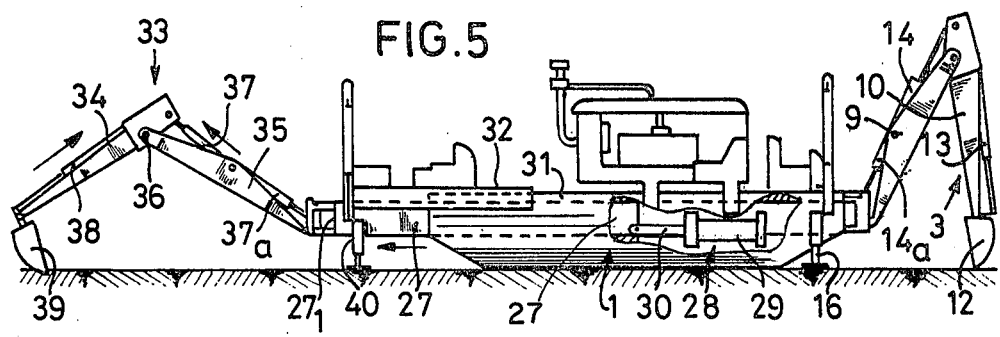

FIG. 2 is a view of the same vehicle machine in an upwardly inclined position for the dismounting and withdrawal of the support wheels, FIG. 3 is a view of the machine in an upwardly inclined position and resting on its wheels, FIG. 4 is a diagrammatic top view of the machine equipped with a scraper, FIG. 5 is a plan view of the machine according to a modification, FIGS. 6A to 6G are diagrams of the principle of the mode of locomotion of the machine according to FIG. 5.

In the chosen embodiment and as illustrated in particular in FIG. 1, the machine essentially comprises a main body or supporting structure 1 and two excavating shovels 2 and 3 which act both as a cleaning out or dredging means and as means of locomotion for the vehicle. The supporting structure has the feature of being constructed in the shape of a long cylindrical body formed by a kind of tank whose ends are closed in a fluidtight manner, at least one of its two ends being bevelled at 4 so as to facilitate the progression and movement of the machine on slimy or marshy ground. The bevelled section may be provided at both ends of the cylindrical body so as to permit the movement thereof in either direction. The cylindrical shape of the body is employed so as to reduce to a minimum the coefficient of friction of this body relative to the ground. This supporting surface 1 acts as a frame for mounting and fixing driving and controlling means, essentially comprising a double-body hydraulic pump feeding the two excavating shovels 2 and 3 and seats 6 on which the operator sits for the purpose of controlling either of the two excavating shovels.

The supporting structure also has the feature of comprising at each end, in facing relation to its ends 7 and 8, an excavating shovel constituted in the known manner by two arms 9 and 10 which are articulated on a common horizontal pin 11, the arm 10 being provided at its end with a bucket 12 which is mounted to be pivotable relative to this arm 10, this bucket 12 being oriented and raised by a double-acting cylinder device 13. The two arms 9 and 10 operate in a manner of a compass and may be retracted or spread apart by means of a control cylinder device 14 actuated by the hydraulic pump 5. The arm 9 is pivotally mounted on the supporting structure 1 by means of a vertical pivot pin 15 so that the two arms are movable in two orthogonal planes containing the vertical pin 15 and horizontal pin 11. The arm 9 is pivotable about its pin 15 through an angle of about 180° so as to be capable of reaching a plane perpendicular to the longitudinal axis of the cylindrical body 1. As concerns the arm 10, it can either come into alignment with the arm 9 (cylinder device 14 retracted) or make an angle with this arm 9 (cylinder device 14 extended).

The shovel assembly 2 or 3, i.e. the two arms 9 and 10 and the bucket 12, may be raised by means of a third cylinder device 14a interposed between the fork of the arm 9 pivotally mounted on the pin 15 and a middle support point for this arm 9 on which the cylinder device 14 is also supported.

The structure may further comprise four stabilizing legs 16 which are pivotally mounted on substantially horizontal pins 17. These legs comprise two tubes $16_1$ and $16_2$ which may be telescopic if required, with the end of the tube $16_1$ being provided with a shoe or plate 18 which is pivotally mounted on a pin 19. These stabilizing means are connected to cylinder devices 20 carried by a derrick 21, these cylinder devices 20 taking up the legs from below by means of sleeves 22 so that when the stabilizing legs are in the raised position (FIG. 1), they are located in a plane which is substantially parallel to the vertical uprights $21_1$ of the derrick 21 so that these legs do not extend beyond the overall width of these derricks 21. This arrangement avoids an increase in the width of the vehicle when the stabilizing legs are raised, this arrangement being especially necessary since the machine has been designed to have a small width so as to be capable of moving in very narrow canals and even in small channels having a width of 1,5 to 2 meters, such as watercress beds. Note in this respect that the cylindrical structure 1 is about 1,2 meter in diameter and that the machine, when the stabilizing legs are in a raised position, is only very slightly larger than this dimension.

With further reference to FIG. 1, the cleaning out machine is provided with a set of wheels 23 serving essentially for transporting the vehicle on the road. Its wheels are provided only at one end of the supporting structure, the other end being, when transporting on the road, hitched to a tractor vehicle and consequently no longer in contact with the ground. These wheels have the feature of being easily dismounted so that the operator can remove them when he has reached the place of work.

As illustrated in FIG. 2, for the purpose of withdrawing the wheels, it is sufficient to plant the bucket 12 in the ground so as to use it as an anchoring point and then extend the cylinder device 14 which, by reaction, raises the front part of the machine, namely the part provided with the set of wheels 23. In this position, the operator can easily proceed to the dismounting of the bolts or other rapid wheel-fixing means. After withdrawing the wheels, the vehicle only rests on its cylindrical supporting surface and its locomotion is directly ensured by the two excavating shovels 2 and 3. The machine is then moved by a pull exerted on one of the shovels and a push exerted on the other, which causes the supporting structure to slide along the ground. When the machine is in a good position, the excavating shovels 2 and 3 are then employed as dredging and cleaning out shovels, one of the shovels, depending on the direction of movement of the machine, having for effect to cut a trench, the other carrying out the finishing operation. In fact, the machine is essentially moved by the cylinder devices 14 and 14a which, in accordance with their retraction or extension and when the buckets are stuck in the ground, move the machine in one direction or the other.

In this respect, FIG. 3 shows that it is possible to raise, i.e. to incline upwardly the other part of the machine by planting the shovel 2 in the ground and acting on its respective cylinder device 14a.

According to a modification, in order to increase the capacity of the machine, the two arms 9 of the excavating shovels may be pivoted to the same side so as to bring them into parallel planes orthogonal to the longitudinal axis of the cylindrical body 1. It is then possible to interconnect the two excavating shovels with a scaper 24, such as a strip of metal, so as to work in the direction of arrow F if it is desired to clean out large areas substantially corresponding to the length of the machine. This scraper can be dismounted and is fixed to the excavating shovel by means of detachable bolts and nuts 24a.

Lastly, in the case where the machine must travel over stretches of water, large-diameter floats may be provided which are for example constituted by fluid-tight containers of cylindrical shape attached to each of the two sides of the supporting structure 1. These floats may be fixed by means of simple bars 26 which are rigid with the supporting structure 1 so that the machine becomes a kind of floating pontoon in the manner of dredges of known type. However, it is obvious that the machine may be made to float without the use of auxiliary floats by suitably dimensioning the main body 1.

Figure 6:
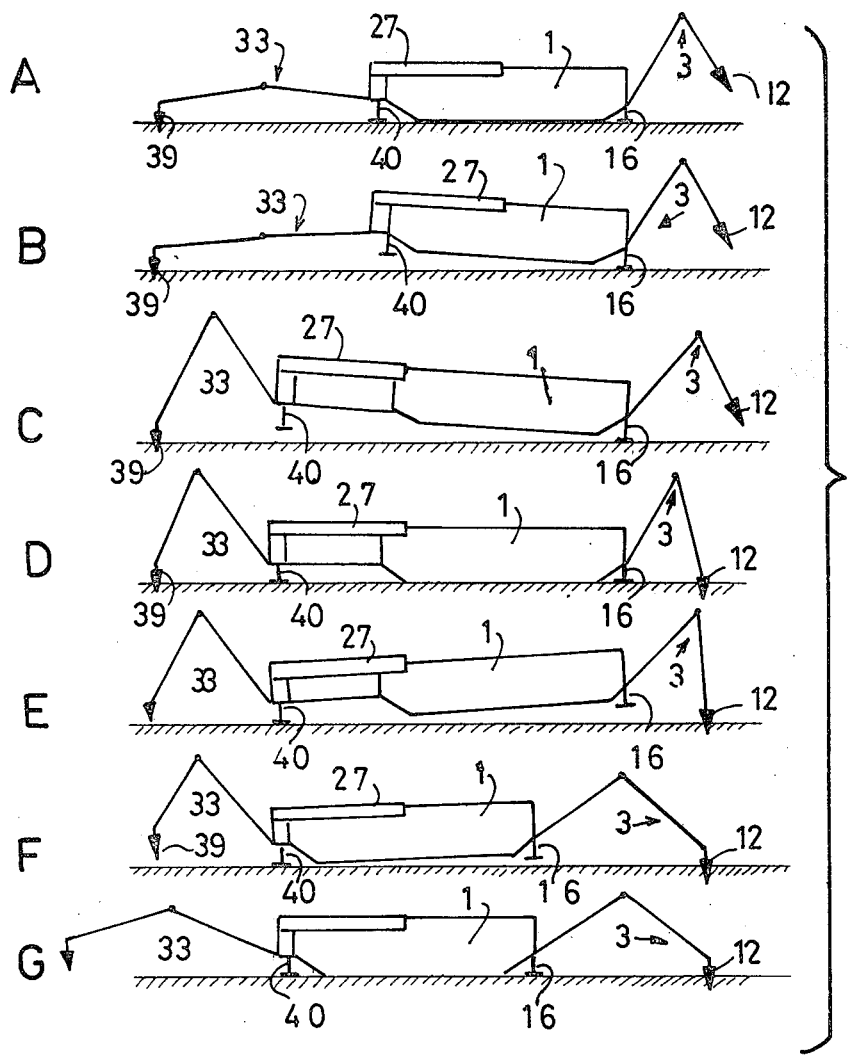

In a modification, such as that shown in FIGS. 5 and 6, the cleaning out machine comprises a supporting structure 1 constituted by a cylindrical body comparable to that illustrated in FIG. 1, but this body is axially extended by a girder or frame 27 which is telescopically mounted in the supporting structure 1 and is capable of increasing the length of the supporting structure and facilitating its displacement to provide locomotion. The extent to which this girder extends out of supporting structure 1 is adjustable, as desired, by means of at least one cylinder device 28, having one part 29 (for example the cylinder) connected to the cylindrical body and the other part 30 (the piston) rigid with the girder 27. This cylinder device is supplied with fluid by a pump to which it is connected. The sliding of the girder relative to the body may be facilitated by slideways 31-32 of complementary shapes provided on the two relatively moving parts or by rollers or runways, as is conventional in mechanical guiding and sliding.

The free end 27 of the girder is provided with an excavating shovel 33, similar to the shovel 2 of FIG. 1, this shovel 33 comprising two arms 34-35 articulated at 36, a first cylinder device 37 for opening and closing the arms, a second cylinder device 38 for regulating the bucket 39, and a third cylinder device 37a for raising the arm 35 and consequently the whole of the shovel. This end also carries stabilizing feet 40 similar to the feet 16 of the machine of FIG. 1. The rear end of the cylindrical body is bevelled and provided with an excavating shovel 3 conforming to that of FIG. 1 and carrying the same reference numerals.

The operation of the two embodiments just described will now be described. The operation of the first embodiment may be described with reference to solely FIG. 1 whereas the operation of the second embodiment will be described with reference to the various FIGS. 6A to 6G owing to the multiplicity of the movements involved.

The machine in FIG. 1 operates in the following manner:

Let it be assumed that the machine is in a position in which the shovel 2, which will be termed the "front shovel", is extended, i.e. with its arms practically in alignment, whereas the shovel 3 or "rear shovel" is folded up so that the body 1 of the machine is disposed nearer to the bucket 12 of this rear shovel.

The whole of the body is then made to rise slightly (for example of the order of 20 centimeters off the ground) by actuating the two cylinder devices 14a so that the body, as it were, is "suspended" between the two arms 10 of the shovels. It will be understood that the cylinder devices 13 were previously actuated so that the two buckets 12 had anchored their teeth in the ground, bearing in mind that it is these buckets which act as support points for the whole of the machine.

When the latter has been raised by means of the cylinder devices 14a, the two cylinder devices 14 are then driven in synchronism so that the cylinder device of the front shovel extends whereas that of the rear shovel retracts (to retract the front shovel 2 toward the body and to extend the rear shovel 3 away from the body). In the course of this synchronized movement of the two shovels, the body 1 moves forward and thus takes up a new position above the ground.

The cylinder devices 14a are then driven in the opposite direction so as to lower the body 1 until its four stabilizing feet 16 resume contact with the ground (this driving of the cylinder devices 14 here corresponding to a retraction whereas it is an extension which previously raised the body). The body has thus reached a position in which it is in the vicinity of the front bucket 12.

The cylinder devices 13 of the two buckets 12 are then actuated so as to disengage them from their anchorage in the ground and then the two cylinder devices 14 are driven in synchronism by retracting that of the front shovel and extending that of the rear shovel, which has for effect to extend the front shovel and fold up the rear shovel.

The cylinder devices 13 of the buckets 12 are then again actuated so as to anchor the latter in the ground, so that the machine is exactly in the same situation as at the start but in a position which is offset in translation relative to the first by a distance which may be, for example, of the order of 1 or 2 meters.

The operation of the second embodiment shown in FIG. 5 will now be described with reference to FIGS. 6A to 6G.

It will be assumed that the machine is in the position of FIG. 6A with its feet 16 and 40 bearing on the ground. The front shovel 33 is extended so as to anchor the bucket 39 in the ground far in front of the machine whereas the rear shovel 3 remains free to work during the first three operations which will be described (this work may for example correspond to the profiling or finishing of the bed of the river in which the machine is located). In this position, the girder 27 is withdrawn into the body 1 since the cylinder device 28 is retracted.

The cylinder device 37a is then actuated to extend it and this slightly raises, for example by 20 cm, the front of the girder 27 and its feet 40 and the machine is thus suspended between two articulated bearing points, one by the front bucket 39 and the other by the rear legs or feet 16.

The cylinder device 38 and the cylinder device 37 are then extended in synchronism and this causes the girder 27 to slide relative to the body 1 so that this girder 27 becomes in overhanging relation to the body, whereas the front shovel 39 is folded up. The machine is thus in the position of FIG. 6C and still suspended between the bucket 39 and the legs 16 whereas the rear shovel 3 is in a free working position.

The cylinder device 37a is then actuated in the opposite direction so as to bring the feet 40 back into contact with the ground and the whole of the girder of the body to a horizontal position. The machine is then in a position of FIG. 6D.

The front bucket 39 can then be disengaged from the ground (by means of its cylinder device 38) which enables it to operate, for example, to prepare the ground. On the other hand, the teeth of the rear bucket 12 are made to anchor into the ground by means of the cylinder device 13 of this bucket. The cylinder device 14a is then actuated to extend and this raises the feet 16 and the rear of the body 1, so that the whole of the machine is suspended between, on one hand the front feet 40 and, on the other hand, the rear bucket 12, the rear feet 16 being, for example, 28 cm off the ground. The machine is then in the position of FIG. 6E.

The cylinder device 29 and the cylinder device 14 are then retracted in synchronism and this moves the body 1 under the girder 27 with a simultaneous extension of the rear shovel 3, since the whole of the machine is in suspension between the feet 14 and the bucket 12. The machine is then in the position of FIG. 6F.

The cylinder device 14a is then actuated in the opposite direction and this causes the rear feet 16 to bear on the ground so that the machine is again disposed in a horizontal position entirely in contact with the ground. The machine is then in the position of FIG. 6G.

It is then sufficient to disengage the bucket 12 from the ground by means of its cylinder device 13 and then retract the cylinder device 37 and simultaneously extend the cylinder device 14 to once again bring the two shovels to the position of FIG. 6A, namely with the front shovel extended and the rear shovel folded up. The machine is again exactly in the same situation as at the start and only its position has changed and corresponds to a translation whose extent is that of the travel of the girder 27 relative to the body 1, which distance may be for example of the order of 2,5 meters.

It is important to note that the two described embodiments are intended for relatively different applications. Indeed, it is only in the case where the machine must operate in a river or like ground whose bed is relatively flat and whose path is relatively rectilinear that the embodiment of FIG. 1 may be employed without difficulty. Indeed, if the bed is very irregular and in particular laterally inclined or if the river has pronounced bends, the suspension of the machine between solely the two buckets 12 would be practically impossible, since the body could not stay exactly in alignment with these two buckets and the machine would be in disequilibrium and would overturn. Essentially, therefore, it is in one of the two aforementioned applications that the embodiment of FIG. 5 has its use (of course it may be employed in other cases, for example on the bed of a river which is extremely stony).

The cleaning out machine according to the invention will have a wide development, since, up to the present time, no vehicle existed which will travel in marshland, and in particular in canals or narrow channels which have a particularly slimy bottom and require particularly frequent maintenance, such as watercress beds and other canals, channels, rivers, in particular for breeding such as pisciculture.

It must be understood that the invention is not limited to the embodiments described above and that other forms and other embodiments may be envisaged without departing from the scope of the invention as defined in the claims.

I claim:

1. In a machine for dredging and cleaning out aquatic bodies such as ponds, marshes, canals, channels, and rivers and comprising a supporting structure with stabilizing feet, means for scraping and dredging said aquatic bodies, said scraping and dredging means mounted on said supporting structure for pivotal movement about a substantially vertical axis and a substantially horizontal axis, and an operating means on said supporting structure for driving and controlling said scraping and dredging means, the improvement wherein:

said supporting structure comprises a central longitudinally extending fluid-tight substantially cylindrical body having a low coefficient of friction with the ground and a base which is beveled at opposite front and rear ends of said body, and wherein said feet are telescopic toward and away from said body;

said scraping and dredging means comprises shovel means for excavating, said shovel means being mounted adjacent each of said body ends for pivoting through an angle of at least 180° from one lateral side of said body to an opposite lateral side of said body about said substantially vertical axis, each of said shovel means comprising first and second arms articulated together, said second arm mounted on said body for pivoting about said substantially vertical axis, a ground-engaging bucket articulated to said first arm, and fluid operated cylinder means for shifting said arms and bucket relative to each other and to said body, said shovel means and said telescopic feet being selectively operable for excavating, for displacing said machine along the ground longitudinally of said body, and for displacing said machine transversely of said body.

2. A machine as in claim 1, and further comprising:
a pair of wheels removably mounted adjacent at least one of said ends of said body for transporting said machine on a road surface; and
jack means comprising said shovel means located adjacent said at least one end of said body for upwardly inclining said machine to permit dismounting of said wheels.

3. A machine as in claim 2 wherein said supporting structure further comprises float means mounted on said body for floating said machine on water.

4. A machine as in claim 2, and further comprising a scraper means for scraping a large width of ground, said scraper means detachably mountable to and extending between said buckets when said shovel means are pointed laterally from one side of said body.

5. A machine as in claim 1, wherein said stabilizing feet comprise two telescoping tubes pivotally mounted on said body, said machine further comprises derricks having a width and mounted on said body and fluid cylinders interposed between and interconnecting said derricks and said tubes, said tubes being raisable to a withdrawn position by said fluid cylinders such that said feet do not exceed said derrick width when in said withdrawn position.

6. A machine as in claim 5 wherein said supporting structure further comprises float means mounted on said body for floating said machine on water.

7. A machine as in claim 5, and further comprising a scraper means for scraping a large width of ground, said scraper means detachably mountable to and extending between said buckets when said shovel means are pointed laterally from one side of said body.

8. A machine as in claim 1 wherein said supporting structure further comprises float means mounted on said body for floating said machine on water.

9. A machine as in claim 1, and further comprising a scraper means for scraping a large width of ground, said scraper means detachably mountable to and extending between said buckets when said shovel means are pointed laterally from one side of said body.

10. In a machine for dredging and cleaning out aquatic bodies such as ponds, marshes, canals, channels, and rivers and comprising a supporting structure with stabilizing feet, means for scraping and dredging said aquatic bodies, said scraping and dredging means mounted on said supporting structure for pivotal movement about a substantially vertical axis and a substantially horizontal axis, and an operating means on said supporting structure for driving and controlling said scraping and dredging means, the improvement wherein:

said supporting structure comprises a central longitudinally extending fluid-tight substantially cylindrical body having a low coefficient of friction with the ground, a girder telescopically mounted adjacent one of said ends of said body and means for adjusting the extent of telescoping of said girder relative to said body, and a base which is beveled at opposite front and rear ends of said body, and wherein said feet are telescopic toward and away from said body;

said scraping and dredging means comprises shovel means for excavating, said shovel means being mounted adjacent each of said body ends for pivoting through an angle of at least 180° from one lateral side of said body to an opposite lateral side of said body about said substantially vertical axis, one of said shovel means being carried by side girder, each of said shovel means comprising first and second arms articulated together, said second arm mounted on said body for pivoting about said substantially vertical axis, a ground-engaging bucket articulated to said first arm, and fluid operated cylinder means for shifting said arms and bucket relative to each other and to said body, said shovel means and said telescopic feet being selectively operable for excavating, for displacing said machine along the ground longitudinally of said body, and for displacing said machine transversely of said body.

11. A machine as in claim 10, wherein said means for adjusting the extent of telescoping of said girder relative to said body comprises a fluid actuated cylinder device interposed between and interconnecting said girder and said body, and wherein said operating means further comprises means for cooperatively actuating said fluid actuated cylinder device and said fluid operated cylinder means to displace said machine along the ground longitudinally of said body.

12. A machine as in claim 11 wherein said supporting structure further comprises float means mounted on said body for floating said machine on water.

13. A machine as in claim 11, and further comprising a scraper means for scraping a large width of ground, said scraper means detachably mountable to and extending between said buckets when said shovel means are pointed laterally from one side of said body.

14. A machine as in claim 10 wherein said supporting structure further comprises float means mounted on said body for floating said machine on water.

15. A machine as in claim 10, and further comprising a scraper means for scraping a large width of ground, said scraper means detachably mountable to and extending between said buckets when said shovel means are pointed laterally from one side of said body.

* * * * *